United States Patent [19]

Reynolds et al.

[11] 4,244,927
[45] Jan. 13, 1981

[54] PROCESS FOR RECOVERING ARSENIC COMPOUNDS BY SODIUM HYDROXIDE LEACHING

[75] Inventors: James E. Reynolds; Enzo L. Coltrinari, both of Golden, Colo.

[73] Assignee: Hazen Research, Inc., Denver, Colo.

[21] Appl. No.: 61,412

[22] Filed: Jul. 27, 1979

[51] Int. Cl.³ ............................................. C01B 27/02
[52] U.S. Cl. ................................. 423/87; 423/150; 423/602
[58] Field of Search ................... 423/87, 602, 150, 38, 423/41, 98, 109, 1; 75/101 R, 72, 104, 109, 117, 118 R, 120, 121

[56] References Cited
U.S. PATENT DOCUMENTS

| | | | |
|---|---|---|---|
| 2,951,741 | 9/1960 | Sill | 423/87 |
| 3,911,078 | 10/1975 | Nadkarni et al. | 423/87 |
| 4,118,243 | 10/1978 | Sandesara | 423/87 |

*Primary Examiner*—O. R. Vertiz
*Assistant Examiner*—Wayne A. Langel
*Attorney, Agent, or Firm*—Sheridan, Ross, Fields & McIntosh

[57] ABSTRACT

An arsenic-recovery process primarily for use in conjunction with the hydrometallurgical processing of arsenic-containing materials for metal recovery. Arsenic is recovered from ferric arsenate by reaction with sodium hydroxide in accordance with the following general reaction:

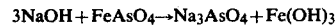

$$3NaOH + FeAsO_4 \rightarrow Na_3AsO_4 + Fe(OH)_3$$

During the processing of high arsenic materials such as smelter flue dust, extremely insoluble ferric-arsenic compounds are generated to immobilize the arsenic during leaching of the metals. The arsenic may be recovered in saleable form from the arsenic-containing residues by leaching with sodium hydroxide and crystallizing the arsenic salts from the leach residue.

19 Claims, No Drawings

PROCESS FOR RECOVERING ARSENIC COMPOUNDS BY SODIUM HYDROXIDE LEACHING

TECHNICAL FIELD

The invention lies in the field of hydrometallurgical recovery of metals, specifically arsenic.

DISCLOSURE OF THE INVENTION

A process for recovering arsenic is provided which may be used in conjunction with metal recovery processes from slags, flue-dust and the like containing arsenic, wherein the arsenic has been immobilized as an extremely insoluble ferric-arsenic compound and carried through various leach states.

The material containing the insoluble ferric-arsenic compound is leached with a hot sodium hydroxide solution in excess of stoichiometric amounts, the liquor evaporated to a high sodium hydroxide concentration, and a soluble arsenic salt crystallized therefrom.

The residue is then treated with ferric ions to fix any remaining arsenic as an insoluble ferric-arsenic compound suitable for disposal.

BACKGROUND ART

A paper, entitled "Hydrometallurgical Recovery or Removal of Arsenic From Copper Smelter By-products" by K. Togawa, Y. Umetsu and T. Nishimura, presented at the 107th A.I.M.E. annual meeting at Denver, Colorado on Feb. 27–Mar. 2, 1978, discusses the problems involved in recovering valuable metals from copper ore refining flue dust, as well as the removal of arsenic as insoluble arsenates and as arsenic sulfide from aqueous solutions, and the hydrometallurgical recovery of arsenic trioxide from arsenic sulfide. The paper does not disclose an integrated process for the successful recovery from the flue dust of metals uncontaminated with arsenic, or the recovery of arsenic as a saleable product, nor does it disclose the other advantages or objectives of the present process.

An earlier article entitled "Recovery of Metals from the Dusts of Flash Smelting Furnace" by Eikichi Mohri and Minoru Yamada presented at the World Mining and Metals Technology Proceedings of the Denver Joint MMIJ-AIME meeting in 1976 discloses a hydrometallurgical process for treating copper smelter dusts by leaching, precipitating some (but not all) copper with hydrogen sulfide, neutralizing to pH2 with calcium carbonate to prevent precipitation of iron arsenate during subsequent copper cementation with iron powder, and finally oxidizing the solution with blowing air to form a stable iron arsenate. This process does not overcome the necessity for handling arsenic in its dangerous soluble forms during metal recovery steps, as does the present invention, nor does it immobilize arsenic in an insoluble state early enough so that substantially complete copper recovery is possible ($H_2S$ precipitation must be halted at 2–3 grams of copper per liter of solution to avoid precipitating arsenic with the copper in this process). Neither does it provide for the recovery of arsenic in saleable form as sodium arsenate. The present process overcomes these problems and allows for substantially complete recovery of copper, zinc, cadmium, lead, and other metals, as well as sodium arsenate.

U.S. Pat. No. 4,149,880 to Prater, et al., discloses a copper cementation process following an oxygen pressure leach of the ore wherein some arsenic is insolubilized and about 0.5 to 2.0 grams per liter arsenic remain in solution. In this process, no attempt is made to insolubilize essentially all the arsenic value as is done in the present process.

U.S. Pat. No. 2,686,114 to McGauley, et al., discloses the insolubilization of arsenic values in a high pressure, high temperature ore oxidation leach using air. Arsenic is precipitated with iron in the ore and with alkaline earth metals as arsenates of these metals. The advantages of total insolubilization of arsenic with ferric ions apparently are not known to these inventors.

BEST MODE FOR CARRYING OUT THE INVENTION

In accordance with the objective of recovering the most valuable metal products first, and processing the arsenic with the least possibility of contamination of recovered products and danger to the environment and to workers handling the materials, copper smelter flue dust is first leached under oxygen pressure with acid, preferably hot sulfuric acid, containing ferric ions to recover one or more of the following: copper, zinc, cadmium, and germanium and to precipitate arsenic as an extremely insoluble ferric-arsenic compound. Next, the residue is leached with hot chloride solution to extract any one or more of the metal values lead, silver, gold, bismuth, and antimony, without solubilizing the arsenic. Finally, the residue is leached with a hot sodium hydroxide solution to recover arsenic as a saleable product, and the tails, after final arsenic fixation, are safely disposed to the environment. The sequential leaching process is summarized as follows:

| Leach Stage | Types | Values Leached |
| --- | --- | --- |
| 1 | Hot $H_2SO_4$ | Cu, Zn, Cd, Ge, |
| 2 | Hot chloride | Pb, Ag, Bi, Au, Sb |
| 3 | Hot NaOH | As |
| Tails | (As fixation) | Unreacted sulfides of Cu, Zn and Fe; sulfur, gold, tin, gypsum, and unreacted ferric oxides |

The process is effective with a wide range of arsenic bearing materials including flue dusts containing in excess of 10% arsenic and less than 6% iron.

In the first leach of the preferred embodiment, copper, zinc, cadmium, and germanium are solubilized by a sulfuric acid leach, which also solubilizes the arsenic. To avoid carrying the arsenic over into the further processing of the liquor to redeem the metal values, the arsenic is oxidized under oxygen pressure and precipitated out as an extremely insoluble ferric-arsenic compound.

The preferred method for supplying the extra ferric ions when necessary for the stoichiometry of completely insolubilizing all the arsenic present is the addition of ferrous sulfate, preferably in excess of the amounts necessary for combination with all the arsenic. The leach system is maintained in an oxidizing mode. The excess ferric ion generated insures precipitation of virtually all of the arsenic.

Although ferric iron may be present in the system in the form of hematite, the solubility of hematite is not high enough to efficiently produce the required excess of ferric ions.

The metal values to be leached are solubilized within a very short time, but because the arsenic present in the flue dust is also extremely soluble, being 50% soluble in water alone, the materials in the system must be allowed to remain in contact for over an hour: depending on temperature and pressure as well as economic requirements, from 1 to 8 hours, and more preferably from 2 to 3 hours. This extended period of time allows for the formation of the insoluble ferric arsenic compound.

An oxidizing mode is maintained at approximately −400 to approximately −500 mv (saturated calomel/platinum electrodes) with oxygen at a pressure of approximately 25 to approximately 75 psi, and more preferably, about 45 to about 55 psi, in order to oxidize the ferrous ions to their ferric state, the arsenic to its pentavalent state, and the sulfides to their more soluble sulfates.

The reaction is conducted at a temperature of between about 90° C. and about 130° C., and more preferably between about 105° C. and about 115° C.

The pH is maintained from about 0.1 to about 1.5, preferably with sulfuric acid, to solubilize as much of the metal values as possible without dissolving the ferric-arsenic compound.

As an optional step, in order to increase the filtration rate of the leach slurry, gypsum may be generated as a filter aid in situ by partially neutralizing the slurry (from 100 to 50 g/l sulfuric acid) with calcium carbonate. This partial neutralization was shown to increase the filter rate in gpm/ft$^2$ by a factor of approximately 10. This step should be omitted if later arsenic recovery from the residue is desired, as the excesss sulfate in the residue lowers arsenic recovery.

A liquid-solid separation is performed and the leach filtrate is then neutralized to pH approximately 2 to 4 by the gradual addition, with agitation, of calcium carbonate. During neutralization, the arsenic is precipitated to less than 100 parts per million, and preferably less than 10 parts per million. This arsenic appears in the gypsum cake formed during neutralization. The ferric-arsenic compound solubility product is nearly constant at this pH, and thus arsenic precipitation increases with increased ferric ion concentration in solution.

During neutralization, the temperature is permitted to reduce to between about 50° C. and about 60° C., to decrease arsenic solubility, and the materials are allowed to remain in contact for about ½ hour to allow time to aid the precipitation.

Copper, zinc, cadmium, and germanium are recovered from the filtrate by conventional methods, including electrowinning of the copper, with sulfuric acid produced in the copper cells being recycled to the sulfate pressure leach. Cadmium and germanium may be recovered by cementation with zinc, and zinc sulfate recovered by evaporation. Because the arsenic has been removed, the filtrate may also be recycled without metal recovery therefrom, to enrich the feed of conventional metallurgical recovery processes for copper and zinc.

Arsenic may be extracted from the residue by means of the sodium hydroxide leach process of this invention described below.

Alternatively, filtered and washed residue from the oxidizing acid leach is advanced to a chloride leach to solubilize lead, silver, gold, bismuth and antimony. A hot chloride solution with an oxidizing agent in the presence of ferric ions extracts the metal values while leaving the arsenic compound undissolved.

Calcium chloride extracts lead as its chloride, which is highly soluble in the chloride solution, from its insoluble sulfate, precipitating gypsum. The chloride solution will contain calcium chloride if extraction of lead is desired, and may also contain sodium chloride, hydrogen chloride, magnesium chloride, and barium chloride as the source of the chloride ions necessary to solubilize the desired metal values.

The oxidizing agent may be sodium chlorate, manganese dioxide, ozone, chlorine, hydrogen peroxide or others, and preferably is sodium chlorate or manganese dioxide.

The oxidizing agent (added in amounts required to adjust the emf to at least about −700 mv) solubilizes the gold while preventing re-leaching of the arsenic. If gold recovery is not desired, only slight oxidizing conditions need be maintained.

If there is insufficient lead in the oxidizing acid leach residue to merit recovery or lead recovery is otherwise not required, the chloride leach may be adjusted by reduction of the calcium chloride and the temperature in order that the lead sulfate will not be solubilized while silver, gold and bismuth values are leached. The chloride level must be sufficient so as to maintain the silver in solution.

The temperature of between about 80° C. and about 105° C., and preferably approximately 95° C.–100° C., and the pH, adjusted at between about 0.1 to 1.0 and preferably between about 0.4 and 0.6 with sulfuric acid, allow for maximum solubilization of the metal values with minimum arsenic extraction.

The leach materials are allowed to remain in contact for between about one-half and two hours and preferably about one hour to insure complete dissolution of the lead, in the presence of ferric ions in a concentration of about 3 g/l, added if necessary as FeCl$_3$. These additional ferric ions, in the oxidizing conditions of the leach, insure that the ferric to ferrous ratio will be high enough to prevent formation of gold and prevent re-leaching of the ferric-arsenic compound.

A liquid-solid separation is performed, and the lead crystallized as high purity lead chloride, after which it may be reduced to elemental lead by pelletization with a carbonaceous material such as coke and an alkaline material such as limestone or calcium oxide at between about 800° C. and about 1000° C. producing a CaCl$_2$ flux which may be recycled to regenerate the chloride leach and return chloride to the system. Silver, gold, bismuth, and antimony may be cemented out of the solution with elemental lead.

Alternatively, the arsenic-free filtrate may be used to enrich feed material for processing of lead ores.

Arsenic is recovered in saleable form from the brine leach residue or from other materials bearing insoluble arsenates in which the arsenic is present in its pentavalent form by leaching in a sodium hydroxide leach of heated, strong, basic solution to extract arsenic as sodium arsenate, according to the generalized reaction-

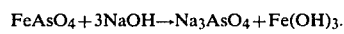

$$FeAsO_4 + 3NaOH \rightarrow Na_3AsO_4 + Fe(OH)_3.$$

Excess sodium hydroxide is preferred. In addition to the stoichiometric amount required for the above reaction, an excess improves the performance of the circuit, and provides for better crystallization of the arsenate.

The sodium hydroxide leach is conducted for one-half to two hours, and preferably about one hour to insure maximum arsenate solubilization.

It is noteworthy that where the oxidizing acid leach slurry was partially neutralized with calcium carbonate prior to filtration, arsenic recovery during the caustic leach is somewhat reduced, and thus, when arsenic recovery is to be performed on the residue, calcium carbonate neutralization should be performed on the original leach liquor after it has been separated from the arsenic-containing residue so as not to add large quantities of gypsum to the residue.

The sodium hydroxide leach is performed at at least about 40° C. in order to solubilize the arsenate. Upper temperature limits are determined by the needs of the crystallization step.

After a liquid-solid separation, a soluble arsenate of high purity is crystallized from the liquid by vacuum evaporation and cooling to approximately 25° C., while stirring. The sodium hydroxide is preferably concentrated to from about 58–79 g/l NaOH to about 154–160 g/l NaOH. The crystals are then filtered, and dried.

Excess sodium hydroxide in the liquid insures that substantially all the arsenic will be crystallized when concentrated to about 154–160 g/l NaOH at room temperature. Further concentration is unnecessary and might result in contamination of the product with crystallized sodium hydroxide.

Due to the high solubility of an arsenate like sodium arsenate in water, the crystals are not washed, but are dried at approximately 80° C.

The excess basic filtrate is recycled to the sodium hydroxide leach. The leach residue may be treated with additional ferric ions to fix the small amount of remaining arsenic and allow for safe disposal to the environment.

EXAMPLES

The following examples are descriptive, but not limiting of the invention.

1. Sulfate pressure leach:

Five-hundred (500) gram samples of copper smelter flue dust were leached in a 2-liter Parr autoclave having an impellor speed of 1550 rpm at 100° C. under an oxygen pressure of 50 psig with an oxygen bleed of 300 cc per minute (except for Test 5 where no oxygen bleed was used). The dust contained 13.9% copper, 2.05% zinc, 9.51% arsenic and 5.60% iron. Test results are summarized in Table 1.

TABLE I

| TEST NO. | SULFATE PRESSURE LEACH | | | | | |
|---|---|---|---|---|---|---|
|  | 1 | 2 | 3 | 4 | 5 | 6 |
| LEACH TIME (hr.) | 2 | 2 | 2 | 1 2 3 | 1 2 3 | 2 |
| emf (mv) | — | — | 4.10 | 430 450 460 | 435 460 460 |  |
| pH | — | — | 0.35 | 0.1 | 0.0 |  |
| LEACH SOLUTION |  |  |  |  |  |  |
| g/l $H_2SO_4$ | 100 | 114 | 50 | 98 | 100 | 100 |
| g/l iron | 5$Fe^{+3}$ | 16.4$FE^{+3}$ | 15.7$Fe^{+3}$ | 19.8$Fe^{+2}$ | 20$Fe^{+2}$ | 34.3$Fe_2O_3$Reagent |
| RESIDUE ASSAY (%) |  |  |  |  |  |  |
| Cu | 1.30 | — | — | 1.79 1.36 1.30 | 1.48 1.24 1.33 | — |
| Zn | 0.25 | — | — | 12.8 0.23 0.20 | 0.27 0.24 0.23 | — |
| As | 11.2 | — | — | 12.8 12.9 13.8 | 13.4 13.2 12.8 | — |
| LIQUOR ASSAY (g/l) |  |  |  |  |  |  |
| Cu | 51.8 | — | 59.2 | 56.6 56.6 56.8 | 52.5 52.0 54.7 | — |
| Zn | 7.40 | — | 8.65 | 8.08 8.08 8.16 | 7.80 7.76 7.68 | — |
| As$_{tot}$ | 13.3 | 5.58 | 4.57 | 5.46 3.65 2.98 | 5.37 3.47 2.40 | 18.6 |
| Fe | 1.0 | 3.10 | 0.56 | 4.55 3.84 3.80 | 4.65 3.81 3.92 | 0.70 |
| % EXTRACTED |  |  |  |  |  |  |
| Cu | 94.7 | — | — | 92.5 93.8 94.1 | 93.8 94.4 94.6 | — |
| Zn | 93.1 | — | — | 92.6 92.9 94.4 | 92.4 92.8 92.8 | — |
| As | 34 | 14 | 11 | 13 8.9 7.3 | 14 9.5 6.7 | 45 |

2. Neutralization:

The autoclave slurry of Example 1 is filtered and the liquor neutralized with calcium carbonate. In Test 1, prior to filtration, partial neutralization (from 100 g/l $H_2SO_4$ to 50 g/l $H_2SO_4$) is effected with calcium carbonate and in Test 2, this partial neutralization is omitted.

The partial neutralization of Test 1 precipitates gypsum which increases the filtration rate for the leach slurry from 0.013 gpm/ft$^2$ to 0.17 gpm/ft$^2$. After filtration of the slurry, the liquor is cooled to 50° to 60° C. and vigorously agitated while calcium carbonate is added in order to neutralize the solution to a pH of about 3. After one-half hour, the material is again filtered. The results of these tests are summarized in Table 2.

TABLE 2

| | NEUTRALIZATION WITH CALCIUM CARBONATE DISTRIBUTION % | | | | | | | | | |
|---|---|---|---|---|---|---|---|---|---|---|
| | TEST 1 | | | | | TEST 2 | | | | |
| PRODUCT | Cu | Zn | Cd | Ge | As | Cu | Zn | Cd | Ge | As |
| LIQUOR | 94.0 | 92.7 | 72.4 | 82 | 6.2 | 94.0 | 93.2 | 76.9 | 82 | 6.7 |
| RESIDUE | 6.0 | 7.3 | 27.6 | 18 | 93.8 | 6.0 | 6.8 | 23.1 | 18 | 93.3 |
| NEUTRALIZED LIQUOD | 93.2 | 92.7 | 71.0 | 53 | <0.03 | 92.9 | 93.1 | 72.5 | 42 | <0.03 |
| CaSO$_4$CAKE | 0.8 | <0.1 | 1.4 | 29 | 6.2 | 1.1 | 0.1 | 4.4 | 40 | 6.7 |
| CaCO$_3$ CONSUMPTION | | | | | | | | | | |

TABLE 2-continued

NEUTRALIZATION WITH CALCIUM CARBONATE
DISTRIBUTION %

| | TEST 1 | | | | | TEST 2 | | | | |
|---|---|---|---|---|---|---|---|---|---|---|
| PRODUCT | Cu | Zn | Cd | Ge | As | Cu | Zn | Cd | Ge | As |
| lb/ton DUST | | | 282 | | | | | 514 | | |

3. Brine Leach:

250 grams of autoclave residue was leached with 250 g/l NaCl, 25 g/l CaCl$_2$ and 3 g/l ferric ion as FeCl$_3$.6-H$_2$O, at a temperature of 95° C. to 100° C. and a pH of 0.5, adjusted with HCl in an oxidizing mode using NaClO$_3$ to achieve an emf of −690 to −700 mv. Test 1 residues were those in which the autoclave leach slurry was partially neutralized before filtration with CaCO$_3$, as described in Example 2, and Test 2 residues were not previously treated with CaCO$_3$. Test results are summarized in Table 3.

TABLE 3

BRINE LEACH
(DISTRIBUTION AS A PERCENTAGE OF
TOTAL FLUE DUST FEED MATERIAL)

| | TEST 1 | | | | | TEST 2 | | | | |
|---|---|---|---|---|---|---|---|---|---|---|
| PRODUCT | As | Pb | Ag | Au | Bi | As | Pb | Ag | Au | Bi |
| LIQUOR | <0.5 | 99.5 | 83.6 | 89 | 77.7 | <0.5 | 99.2 | 85.8 | 89 | 77.8 |
| RESIDUE | 93.8 | 0.4 | 16.0 | 11 | 21.0 | 93.3 | 0.8 | 13.8 | 11 | 21.8 |

4. Caustic leach and sodium arsenate crystallization:

The residue from the brine leach described in Example 3 was leached in sodium hydroxide at 40° C. to extract arsenic as sodium arsenate. 3 grams of sodium hydroxide were used for each gram of arsenic dissolved plus an excess of 70 g/l. Test 1 residue was the result of the partially neutralized autoclave slurry described in Example 2. Test 2 was as described in Example 2. The leach slurry was then filtered and the liquid evaporated under vacuum to alter the sodium hydroxide concentration from 58–79 to 154–160 g/l NaOH, and cooled to 25° C. while stirring to crystallize sodium arsenate from the liquid. The crystals were then dried on a Buchner funnel without washing, and further dried at 80° C. Test 2 residue was derived from non-neutralized autoclave slurry residue. Test results are summarized in Table 4. The values for "Liquor" and "Residue" resulted from the caustic leach. The values for "Mother Liquor" and "Crystals" resulted from the sodium arsenate crystallization.

A further test was performed on non-neutralized residue using a leach time of 4¾ hours and an excess sodium hydroxide of 80 g/l, and resulting in 88.3% arsenic extraction.

Sodium arsenate crystals from all tests were of good purity, with only minor amounts of entrained sodium sulfate and co-crystallized tin as impurities. Bismuth and germanium, which tended to report in varying degrees to all prior leach liquors and residues, were substantially not present in the sodium arsenate crystals.

TABLE 4

CAUSTIC LEACH AND SODIUM ARSENATE
CRYSTALLIZATION DISTRIBUTION AS A PERCENT OF THE FLUE DUST FEED MATERIAL

| | TEST 1 | | | | TEST 2 | | | |
|---|---|---|---|---|---|---|---|---|
| PRODUCT | As | Bi | Sn | Ge | As | Bi | Sn | Ge |
| LIQUOR | 80.9 | 0.1 | 1.9 | <5 | 87.0 | 0.1 | 3.0 | <5 |
| RESIDUE | 12.9 | 20.9 | 94.6 | 8-18 | 6.3 | 21.7 | 92.6 | 8-18 |
| MOTHER | 8.4 | — | 0.1 | — | 4.9 | — | 0.1 | — |

TABLE 4-continued

CAUSTIC LEACH AND SODIUM ARSENATE
CRYSTALLIZATION DISTRIBUTION AS A PERCENT OF THE FLUE DUST FEED MATERIAL

| | TEST 1 | | | | TEST 2 | | | |
|---|---|---|---|---|---|---|---|---|
| PRODUCT | As | Bi | Sn | Ge | As | Bi | Sn | Ge |
| LIQUOR CRYSTALS | 72.5 | — | 1.8 | — | 82.1 | — | 2.9 | — |

5. Arsenic fixation:

Arsenic solubility in the brine and caustic leach residues, for residues initially partially neutralized before filtration of the sulfate pressure leach as described in Example 2 and for non-neutralized residues, was determined after fixing the arsenic by the addition of 2 ml 100 g/l Fe$^{+3}$ in the form of Fe$_2$(SO$_4$)$_3$ to 10 grams of residue slurried with 75 ml H$_2$O, the emf being adjusted to −500 mv, and the pH being adjusted to approximately 2.0 with sulfuric acid. Calcium carbonate was then added to adjust the pH to 4.0 and the mixture stirred for one hour at 25° C. The solubility of the fixed arsenic was then tested by contacting with demineralized water for up to 5 days. Test results are summarized in Table 5.

These results show extremely low arsenic solubility, even at fairly low pH, thus confirming that the brine and caustic leach residues are environmentally safe for disposal.

TABLE 5

ARSENIC FIXATION

| | pH | SOLUBILITY ppm/As |
|---|---|---|
| BRINE RESIDUE (neutralized) | | |
| Days: 0 | 4.0 | <0.3 |
| 1 | 3.4 | <0.4 |
| 4 | 3.4 | <0.3 |
| 5 | 3.5 | <0.3 |
| BRINE RESIDUE (not neutralized) | | |
| Days: 0 | 4.0 | <0.3 |
| 1 | 3.5 | <0.3 |
| 4 | 3.5 | <0.3 |
| CAUSTIC RESIDUE (neutralized) | | |
| Days: 0 | 4.0 | <0.3 |
| 3 | 3.6 | <0.3 |
| 4 | 3.7 | <0.3 |
| 5 | 3.8 | <0.3 |
| CAUSTIC RESIDUE (not neutralized) | | |
| Days: 0 | 4.0 | <0.3 |
| 3 | 3.6 | <0.3 |
| 4 | 3.8 | <0.3 |
| 5 | 3.8 | <0.3 |

We claim:

1. A process for recovering arsenic from materials containing ferric-arsenic compounds in which the arsenic is present in its pentavalent state, comprising:
   (a) leaching the material with a stoichiometric excess of a sodium hydroxide solution;
   (b) performing a liquid-solid separation on the leach materials; and
   (c) crystallizing the soluble arsenic salt from the liquid of step (b).

2. The process of claim 1 wherein ferric ions are added to fix the arsenic in the leach residue.

3. The process of claim 2 wherein the ferric-arsenic mixture is neutralized to a pH between about 3.5 and about 4.5 with calcium carbonate.

4. The process of claim 1 wherein the leach is performed at a temperature of at least 40° C.

5. The process of claim 1 wherein the leach is performed for about one-half to about two hours.

6. The process of claim 1 wherein the leach is performed for about one hour.

7. The process of claim 1 wherein following separation of the leach liquid, vacuum evaporation is performed to concentrate the sodium hydroxide from about 50–80 grams per liter to about 150 to 160 grams per liter, in order to crystallize the sodium arsenate product.

8. The process of claim 1 wherein during crystallization the liquid is allowed to cool to about 25° C.

9. The process of claim 1 wherein following crystallization the crystals are dried without washing at about 80° C.

10. A hydrometallurgical process for recovering arsenic as sodium arsenate from residues containing arsenic resulting from the step of serially leaching various metal values while carrying ferric-arsenic compounds in which the arsenic is present in its pentavalent state undissolved in the residues, which comprises
    (a) leaching the residues with sodium hydroxide in excess of stoichiometric amounts to permit a reaction wherein sodium arsenate is formed in solution and the ferric ions are precipitated by means of the hydroxide;
    (b) performing a liquid-solid separation on the material of step (a);
    (c) crystallizing sodium arsenate from the liquid of step (b).

11. The process of claim 10 wherein the leach is performed at a temperature of at least about 40° C.

12. The process of claim 11 wherein the leach is performed for about one hour.

13. The process of claim 10 wherein the solids of step (b) are treated with ferric ions to fix the arsenic as a ferric arsenic compound suitably insoluble for disposal.

14. The process of claim 13 wherein the ferric ions added are ferric sulfate in the amount of 20 grams per kilogram of residue, and the mixture is neutralized to about pH 3.5 to about 4.5 with calcium carbonate to aid precipitation of ferric-arsenic material.

15. The process of claim 10 wherein in step (c) the sodium arsenate is crystallized by vacuum evaporation of the liquid from a concentration of about 50–80 grams sodium hydroxide per liter of about 150 to 160 grams per liter, and allowing to cool to about 25° C.

16. The process of claim 10 wherein following step (c) the crystals are dried without washing.

17. A process for recovering arsenic from arsenic-containing materials comprising:
    (a) oxidizing the arsenic to its pentavalent state;
    (b) precipitating the arsenic with ferric ions as ferric arsenate;
    (c) leaching the ferric arsenate with a sodium hydroxide solution at a temperature of at least about 40° C.;
    (d) performing a liquid-solid separation on the leach materials; and
    (e) crystallizing an arsenic salt from the liquid of step (d) by evaporation.

18. The process of claim 17 wherein the solid residue of step (d) is treated with additional ferric ions and an alkaline earth metal carbonate to adjust the pH to about 3.0 to 4.5 to fix all the arsenic present as a highly insoluble ferric arsenate suitable for disposal.

19. A process for recovering arsenic as sodium arsenate from a leach residue which contains a ferric-arsenic compound wherein the arsenic is present in its pentavalent state which comprises:
    (a) leaching the residue with sodium hydroxide in excess of stoichiometric amounts to solubilize the arsenic at a temperature of at least about 40° C.;
    (b) performing a liquid-solid separation on the material of step (a);
    (c) performing a vacuum evaporation on the liquid of step (b) to increase the sodium hydroxide concentration from about 55 to 80 grams sodium hydroxide per liter to about 150 to 160 grams per liter and allowing to cool to crystallize sodium arsenate;
    (d) drying the arsenate crystals without washing; and
    (e) fixing any arsenic remaining in the solids of step (b) by adding 20 grams ferric sulfate per kilogram of residue and neutralizing to between about pH 3.5 to 4.5 with calcium carbonate to form ferric-arsenic compounds suitably insoluble for disposal to the environment.

* * * * *